(12) United States Patent
Wade (10) Patent No.: US 7,775,225 B2
(45) Date of Patent: Aug. 17, 2010

(54) WASHING AND STORING SYSTEMS FOR MACHINERY

(76) Inventor: Gary Wade, 969 Gary Dr., Columbus, OH (US) 43207

( * ) Notice: Subject to any disclaimer, the term of this patent is extended or adjusted under 35 U.S.C. 154(b) by 464 days.

(21) Appl. No.: 11/675,170

(22) Filed: Feb. 15, 2007

(65) Prior Publication Data
US 2007/0209681 A1    Sep. 13, 2007

Related U.S. Application Data

(60) Provisional application No. 60/780,428, filed on Mar. 8, 2006.

(51) Int. Cl.
  *B08B 3/00*    (2006.01)
(52) U.S. Cl. .................. 134/200; 134/104.2; 134/198
(58) Field of Classification Search ............ 134/10, 134/34, 198, 104.2, 184, 103.2, 200
  See application file for complete search history.

(56) References Cited

U.S. PATENT DOCUMENTS

| | | | |
|---|---|---|---|
| 3,087,585 A | | 4/1963 | Knuth et al. |
| 3,108,608 A | | 10/1963 | Mahowald |
| 3,258,019 A | * | 6/1966 | Bellas et al. ............. 134/99.2 |
| 3,322,347 A | | 5/1967 | Pierce |
| 3,698,029 A | * | 10/1972 | Pulliam .................... 15/88.3 |
| D226,574 S | | 3/1973 | Fernandez et al. |
| 3,856,028 A | | 12/1974 | Kehler |
| 4,178,977 A | | 12/1979 | Sur et al. |
| 4,279,263 A | * | 7/1981 | Pulliam ..................... 134/111 |
| 4,306,390 A | | 12/1981 | Brown |
| 4,673,227 A | | 6/1987 | Anderson |
| 4,712,573 A | | 12/1987 | Kuhl |
| 4,784,327 A | | 11/1988 | Lund |
| 4,819,676 A | * | 4/1989 | Blehert et al. ............. 134/21 |
| 4,876,832 A | | 10/1989 | Wasserman |
| 4,894,961 A | | 1/1990 | Robbins |
| 4,997,000 A | | 3/1991 | Feast et al. |
| 5,042,242 A | | 8/1991 | Evans |
| 5,152,459 A | | 10/1992 | Boeh |
| 5,312,047 A | | 5/1994 | Akers |
| D349,163 S | | 7/1994 | Rasmussen |
| 5,444,967 A | | 8/1995 | Meuth |
| 5,507,121 A | | 4/1996 | Taylor |
| 5,572,759 A | | 11/1996 | Zachhuber |
| 5,651,242 A | | 7/1997 | Kittridge |
| 5,673,856 A | | 10/1997 | Krohn |
| D386,844 S | | 11/1997 | Borysewicz |

(Continued)

*Primary Examiner*—Michael Kornakov
*Assistant Examiner*—Naomi Birbach
(74) *Attorney, Agent, or Firm*—McNees Wallace & Nurick (57) ABSTRACT

A device for washing and storing machinery is provided. This device includes a storage apparatus and a washing apparatus formed integrally with the storage apparatus. The storage apparatus further includes: a housing defining an internal chamber therein; a base attached to the bottom portion of the housing, wherein the base further includes at least one aperture formed therein; a debris tray attached to the base, wherein a portion of the tray is positionable beneath the aperture formed in the base; and a door for gaining access to the internal chamber, wherein the door further includes a floating upper portion and a lower portion connected to the base. The washing apparatus further includes: a plurality of directional sprayers, wherein the plurality of directional sprayers are located within the housing and the base; and plumbing for connecting the plurality of sprayers to one another and to a source of pressurized fluid.

11 Claims, 6 Drawing Sheets

U.S. PATENT DOCUMENTS

| | | |
|---|---|---|
| D395,659 S | 6/1998 | Moiseve |
| 5,758,674 A | 6/1998 | Taeger |
| 6,263,648 B1 | 7/2001 | Carlson |
| 6,332,554 B1 | 12/2001 | McCarthy |
| 6,364,960 B1 | 4/2002 | Bayley |
| 6,427,707 B1 * | 8/2002 | Morris ........................ 134/72 |
| 6,474,625 B2 | 11/2002 | Bevre |
| D467,690 S | 12/2002 | Kee |
| 6,581,363 B1 | 6/2003 | Hall |
| D486,161 S | 2/2004 | Greene |
| D512,728 S | 12/2005 | Di Rienzo |
| 7,121,592 B2 * | 10/2006 | Sazbo et al. ................. 285/305 |
| 2004/0231703 A1 | 11/2004 | McCormick et al. |
| 2005/0139243 A1 | 6/2005 | Hay et al. |
| 2005/0214159 A1 * | 9/2005 | Schwei et al. ................. 422/28 |

* cited by examiner

WASHING AND STORING SYSTEMS FOR MACHINERY

CROSS-REFERENCE TO RELATED APPLICATIONS

This patent application claims the benefit of U.S. Provisional Patent Application Ser. No. 60/780,428 filed on Mar. 8, 2006 and entitled "MO-N-STO Cleaning System" the disclosure of which is incorporated by reference as if fully rewritten herein.

BACKGROUND OF THE INVENTION

The described invention relates in general to storage units for machinery, and more specifically to a system for washing and storing machinery such as hand-operated lawn mowers and the like.

Hand-operated lawn mowers and other machinery used by home or property owners for yard maintenance and landscaping are typically stored in garages, carports, or off-site storage units where they occupy a considerable amount of physical space. If physical space within such storage areas is inadequate, then the lawn mower or other piece of machinery is often simply left outside where it may or may not be covered with a tarp or otherwise protected from the elements or from theft. Because lawn mowers and other landscape maintenance equipment are often quite expensive and somewhat sensitive to environmental conditions, there exists an ongoing need for a convenient storage system for that does not necessarily occupy valuable space within a garage, carport, or storage unit.

In addition to occupying otherwise usable storage space in a structure, lawn mowers and other landscaping or yard maintenance equipment are often covered with grass, dirt, or other debris after they have been used for their intended purpose. Over time, a significant amount of this grass, dirt, or other debris is deposited in the garage, carport, or storage unit; thus, creating problems with keeping the storage area clean. Grass, dirt, or other debris from lawn mowers is particularly undesirable in environments where valuable items such as automobiles, motorcycles, boats, or furniture, are stored. Furthermore, debris that has accumulated on a piece of machinery such as a lawn mower may ultimately affect its function and decrease its useful life. Thus, there is an ongoing need for a washing system that adequately removes grass, dirt and other debris from lawn mowers or other equipment in addition to providing short or long-term storage space for such equipment.

SUMMARY OF THE INVENTION

The following provides a summary of exemplary embodiments of a washing and storing system for machinery according to the present invention. This summary is not an extensive overview and is not intended to identify key or critical aspects or elements of the present invention or to delineate its scope.

In accordance with one aspect of the present invention, a system for washing and storing machinery is provided. This system includes a storage apparatus for enclosing and storing machinery, a washing apparatus connected to or formed integrally with the storage apparatus for washing machinery enclosed within the storage apparatus, and a source of pressurized water or washing fluid connected to the washing apparatus. The storage apparatus further includes: a housing, wherein the housing defines an internal chamber therein; a base attached to or formed integrally with a bottom portion of the housing, wherein the base further includes at least one aperture formed therein; a tray slidably attached to the base, wherein the tray is positionable beneath the aperture formed in the base; a door assembly for gaining access to the internal chamber, wherein the door assembly further includes an upper portion connected to the housing and a lower portion connected to the base, and wherein the lower portion of the door functions as ramp into the internal chamber. The washing apparatus further includes: a plurality of sprayers in fluid communication with one another, wherein the plurality of sprayers is located within at least one of the housing and the base, and wherein the plurality of sprayers are positioned to direct washing fluid onto machinery within the storage apparatus; and a source of pressurized fluid in communication with the sprayers. The source of pressurized fluid provides fluid, i.e., water, to the washing apparatus.

In accordance with another aspect of the present invention, a device for washing and storing machinery is provided. This device includes a storage apparatus for enclosing and storing machinery and a washing apparatus integrated into storage apparatus for washing machinery enclosed within the storage apparatus. The storage apparatus further includes: a housing, wherein the housing defines an internal chamber therein; a base attached to or formed integrally with a bottom portion of the housing, wherein the base further includes an aperture formed therein; a textured debris tray slidably attached to the base, wherein the tray is positionable beneath the aperture formed in the base; and a door for gaining access to the internal chamber, wherein the door further includes an upper portion connected to the housing and a lower portion connected to the base. The washing apparatus further includes: a plurality of directional sprayers, wherein the directional sprayers are located either within the housing and the base or within either the housing or the base; and plumbing for connecting the plurality of sprayers to one another and to a source of pressurized washing fluid such as water.

In yet another aspect of this invention, a method for washing and storing machinery is provided. This method includes: (a) providing a device for storing for and washing machinery, wherein the device further includes: a storage apparatus and a washing apparatus connected to the storage apparatus, wherein (i) the storage apparatus further includes: a housing, defining an internal chamber therein; a base attached to or formed integrally with a bottom portion of the housing, an aperture formed in the base; a tray slidably attached to the base, wherein the tray is positionable beneath the aperture formed in the base; and a door for gaining access to the internal chamber, wherein the door further includes an upper portion connected to the housing and a lower portion connected to the base; and wherein (ii) the washing apparatus further includes: a plurality of directional sprayers located within the housing and the base; and plumbing for connecting the plurality of sprayers to one another; (b) opening the door and positioning machinery within the storage apparatus such that at least a portion of the machinery is located over the aperture formed in the base; and (c) connecting a source of pressurized fluid to the plumbing; wherein connecting a source of pressurized fluid to the plumbing delivers the fluid to the sprayers for removing dirt and debris from the machinery, and wherein at least a portion of the dirt and debris removed from the machinery drains through the aperture and onto the tray.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to systems, devices, and methods for cleaning and storing various common items. A first general embodiment of this invention provides a system for washing and storing machinery; a second general embodiment of this invention provides a device for washing and storing machinery such as landscape equipment; and a third general embodiment of this invention provides a method for washing and storing machinery such as lawn mowers and the like.

With reference now to the Figures, FIGS. 1-5 illustrate exemplary embodiments of storing and washing system 10, wherein system 10 includes a storage apparatus 20 and a washing apparatus 80 that is attached to and fully integrated into storage apparatus 20. Storage apparatus 20, which may be manufactured in any of a variety of shapes and sizes, further includes housing 22 and base 42, which is attached to or formed integrally with housing 22. Housing 22, which is typically manufactured from plastic, polymer, treated wood, or any other suitable material, includes front panel 24, first side panel 26, second side panel 28 and top panel 30, which together form an internal chamber for storing machinery or other items. In some embodiments of this invention, the front, top, and side panels may be transparent or translucent, or portions of these panels may be transparent or translucent. Additionally, the various panels may be manufactured as individual pieces and attached to one another by clamps or similar devices or the entire housing 22 may be a single molded piece or multiple molded pieces that are connectable to one another by various known means. In the exemplary embodiment shown in the Figures, an L-shaped portion of each door latch 32 is mounted on side panel 26 and side panel 28 and a substantially ring-shaped portion of each door latch 32 is mounted on either side of upper door panel 70. Door tracks 34 are mounted on the bottom or inside surface of top panel 30. In some embodiments, lengths of weather stripping or other material may be included on the rear edges of side panels 26 and 28 for forming a seal with door assembly 68 when door assembly 68 is in a closed position on housing 22.

In the exemplary embodiment, housing 22 is attached to base 42, which typically includes an aperture 44 formed therein near front panel 24. Tracks 46, which substantially extend from the rear portion of housing 22 to the front portion of housing 22, act as guides to direct a lawn mower or other wheeled piece of machinery or equipment over aperture 44. Tracks 46 may be permanently fixed to base 42 or they may be adjustable to accommodate different wheel placements. In some embodiments, one or more drainage slots or holes 43 are also formed in base 42 (see FIG. 5). These slots or holes 43 drain to the outside environment or into a basin or pan attached to or formed on the underside of base 42. Water or cleaning fluid captured in this basin or pan exits base 42 through spout 53. The underside of base 42 also typically includes at least one transverse support member 48 for adding structural stability to storage apparatus 20. Wheels 50 are rotatably connected to the front portion of base 42 and handles 52 are typically attached to the rear portion of base 42, both for facilitating movement of storage apparatus 20 from place to place.

As best shown in FIGS. 1, 2, and 4A-B, debris tray 60 is slidably mounted within base 42 on tracks 62 for catching dirt, grass, and other matter that is removed from machinery washed within housing 22. When fully inserted into base 42, tray 60 is positioned beneath aperture 44 (see FIG. 3). Tray 60 typically includes a ridged, ribbed, or otherwise textured surface 64 that facilitates the capture and retention of dirt, grass, or other debris. In the exemplary embodiment, tray 60, which may be manufactured from metal, heavy plastic or polymer, or any other suitable material, may be partially or completely removed from base 42 for purposes of cleaning the tray. Tray 60 may be removed from base 42 by simply pulling the tray forward until tray 60 is partially or completely removed from base 42. Tray 60 may be reinserted into base 42 by aligning the edges of the tray with tracks 62 and pushing the tray back into base 42. In some embodiments, a handle 66 is formed in tray 60 for facilitating removal of tray 60 from base 42 (see FIGS. 1-2).

Figure 1:
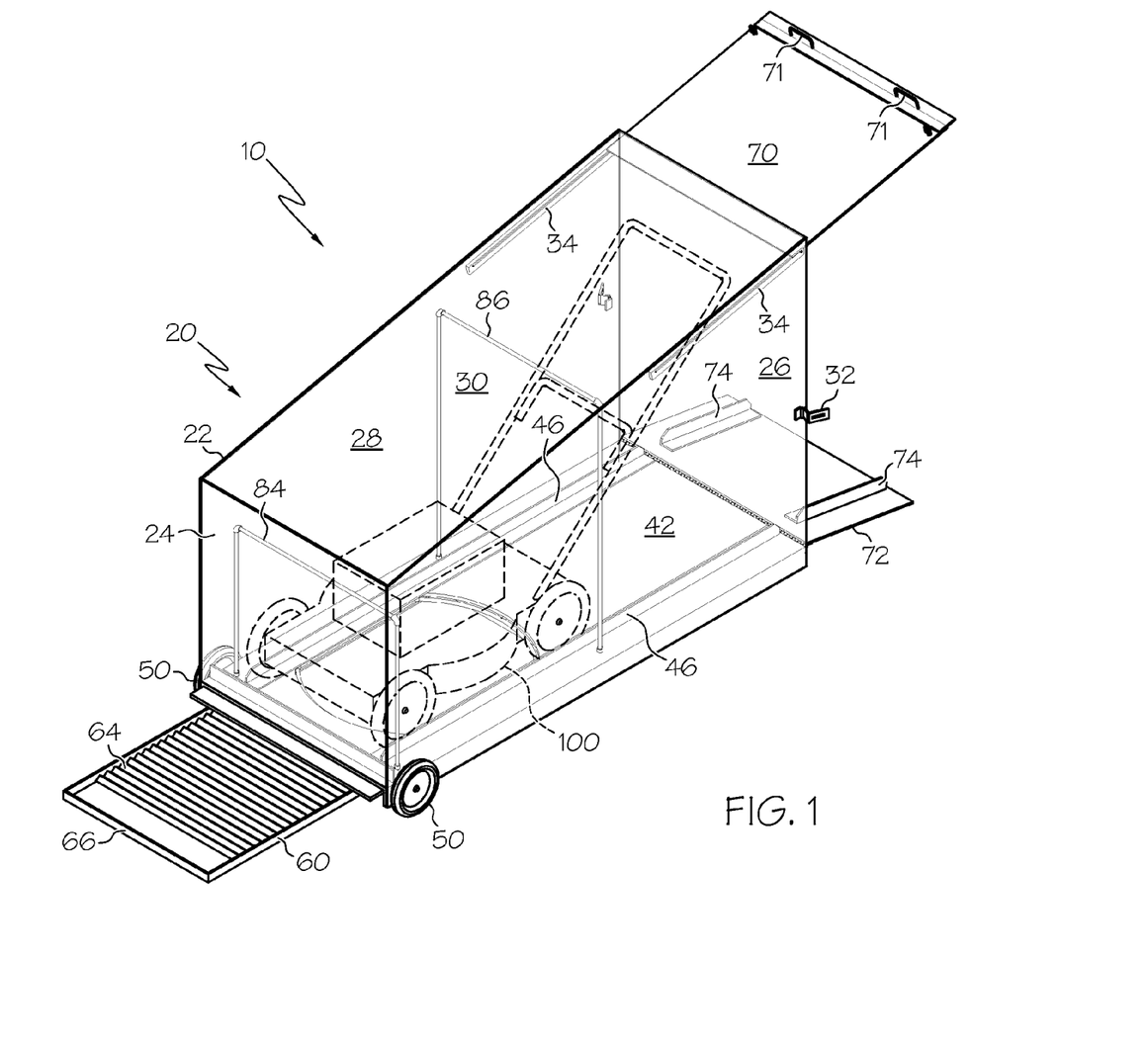
FIG. 1 is a front, perspective view of an exemplary embodiment of the washing and storing system of the present invention showing a lawn mower properly positioned within the enclosure.
Figure 2:
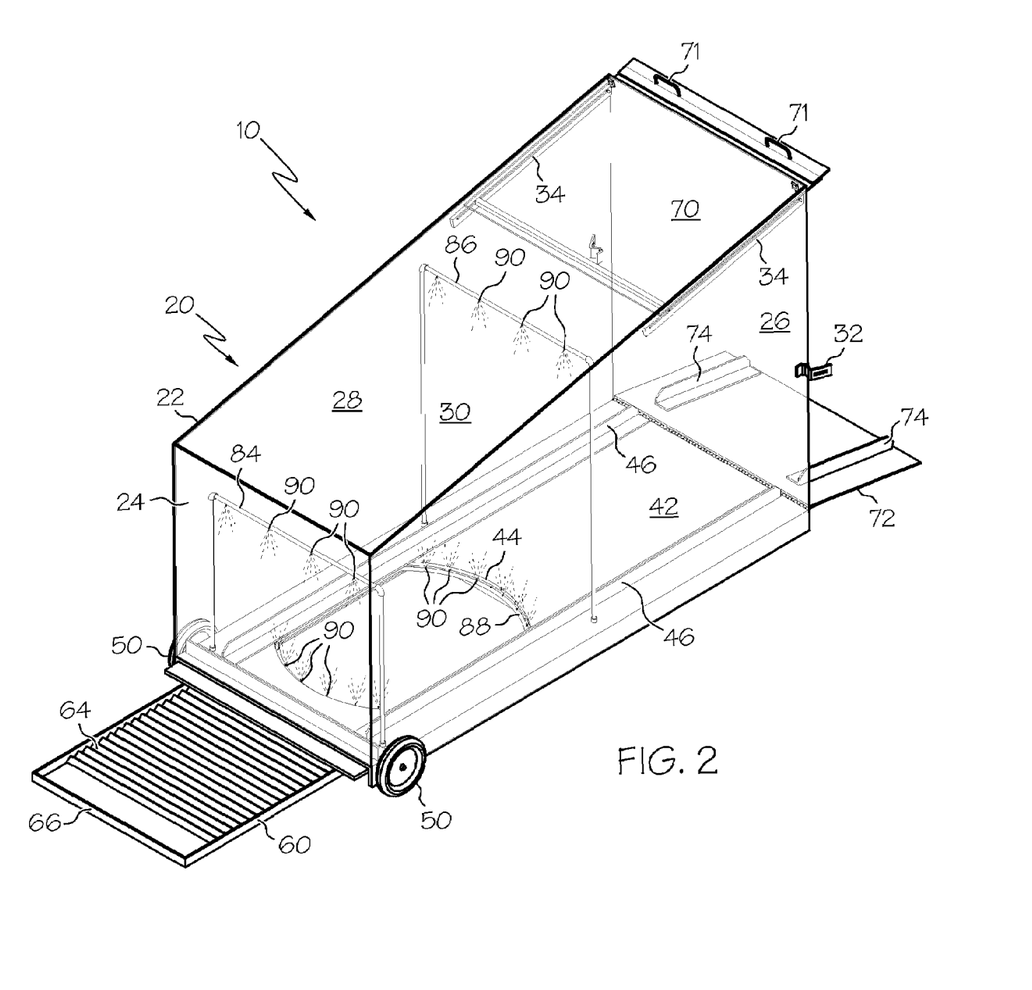
FIG. 2 is a front, perspective view of the exemplary embodiment of FIG. 1 shown without a lawn mower positioned within the enclosure.
Figure 3:
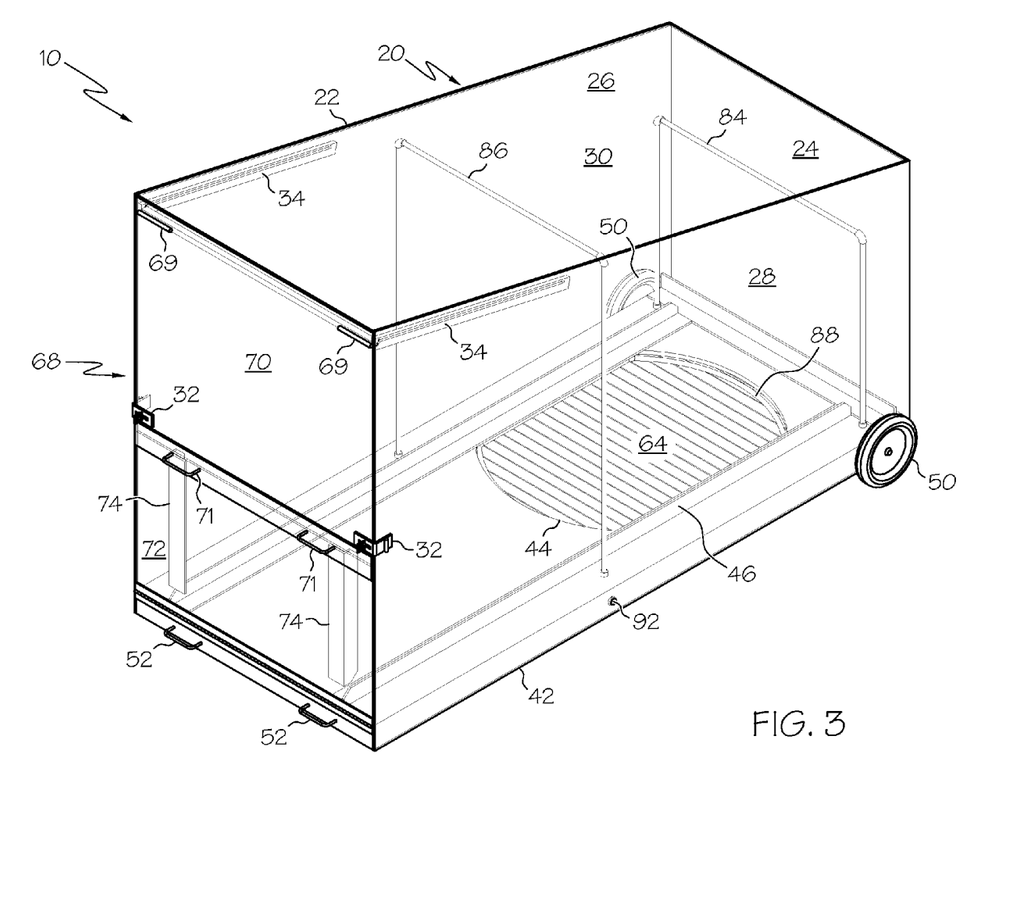
FIG. 3 is a rear, perspective view of the exemplary embodiment shown in FIG. 2.

Also attached to base 42 is a portion of a door assembly or door 68 (see FIG. 3). In the exemplary embodiment, door 68 includes "floating" upper door portion 70 and lower door portion 72, which in the exemplary embodiment is hingedly attached to base 42. As will be appreciated by the skilled artisan, door 68 may be manufactured from plastic, polymer, wood, or any other suitable material. When in the closed position, lower door portion 72 may be held against housing 22 by magnetic means, mechanical means, or a combination thereof. When lower door portion 72 is in the open position (see FIG. 2), it serves as a ramp leading into the internal chamber within housing 22. Tracks 74, the relative positions of which may be adjustable, are mounted or formed on the inner surface of lower door portion 72 and serve as wheel guides. In the exemplary embodiment of this invention, upper door portion 70 is held in a closed position (see FIG. 3) by door latches 32 and by two or more substantially cylindrical biasing members 69 that are flexibly attached to housing 22 near the top, rear portions of side panels 26 and 28. Biasing members 69 are typically torsion springs or other spring-loaded devices that urge upper door portion 70 toward a closed position. Upper door portion 70 is opened by releasing door latches 32, lifting, i.e., rotating, upper door portion 70 toward top panel 30 (using handles 71) and into tracks 34 which guide the top/front edge of upper door portion 70 downward and into housing 22 (see FIG. 2). Top panel 30 may include slots (not shown) for receiving the ring-shaped portions of each door latch 32 to secure the door within housing 22. Other embodiments of this invention include an upper door portion that recedes into housing 22 in a manner similar to that of a roll-top desk or the like.

Figure 4A:
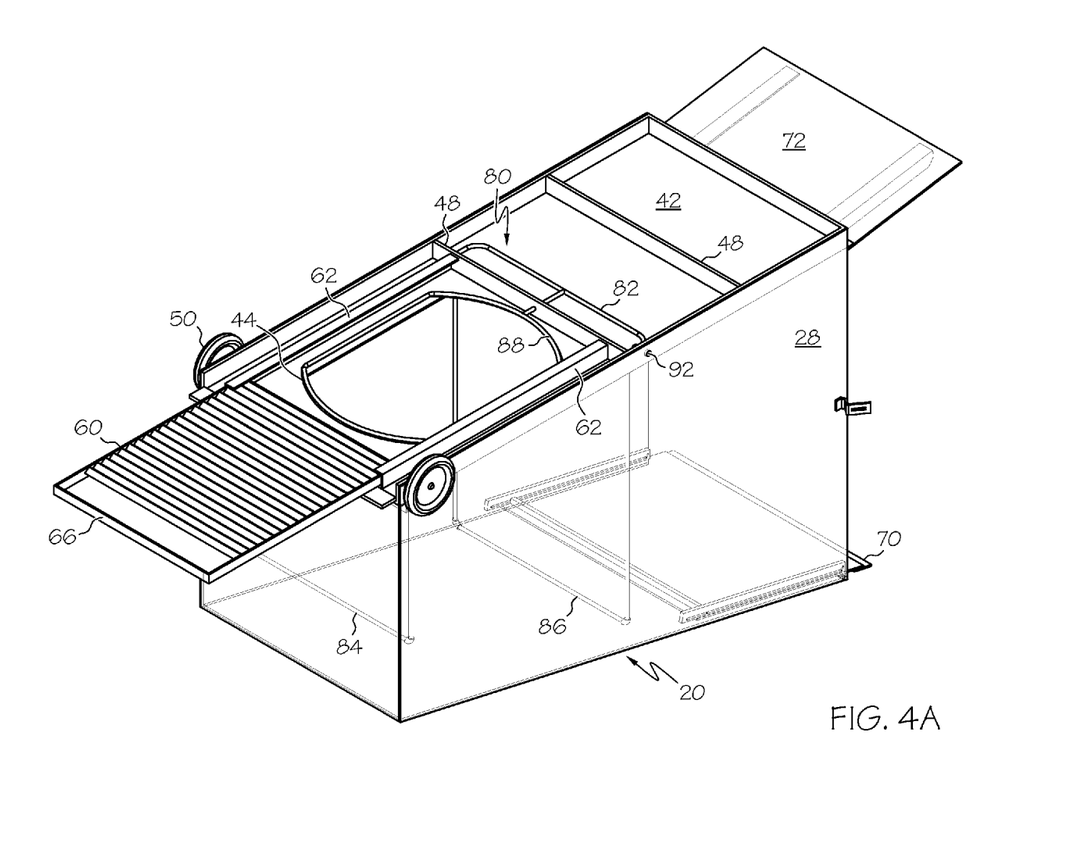
FIG. 4A-B are front, perspective and bottom views of the exemplary embodiment of FIG. 2 showing the underside of the washing and storing system of the present invention.
Figure 4B:
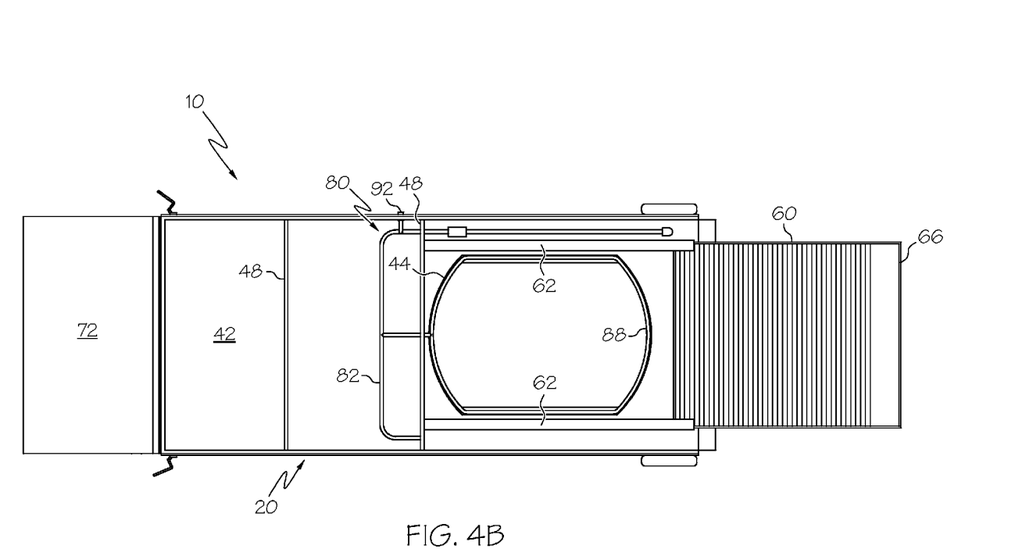

As best shown in FIGS. 4A-B, washing apparatus 80, which is fully integrated into storage apparatus 20, includes a plurality of metal or plastic pipes or tubing that form plumbing system 82. In an exemplary embodiment, a portion of plumbing system 82 extends upward and into housing 22, and includes first housing spray rack 84 and second housing spray rack 86. Each of these spray racks includes a plurality of sprayers 90, each of which is directed generally downward (see FIG. 2). A portion of plumbing system 82 is also mounted within base 42 and extends along the periphery of aperture 44 to form base spray rack 88. Base spray rack 88 also includes a plurality of individual sprayers 90; however, these sprayers are directed generally upward (see FIG. 2). Sprayers 90 may include small holes formed at various points along the spray racks or sprayers 90 may include individual, directional spray heads connected directly to plumbing system 82 at various points. Water or other washing fluid derived from sources such as water faucets or garden hoses is supplied to plumbing system 82 through inlet 92. A quick-connect device with a shut-off valve may be attached to inlet 92 for added convenience. A pump or other pressure increasing means may be used with washing apparatus 80 to increase the pressure of water or other fluid supplied to plumbing system 82 and sprayers 90.

Washing and storing system 10 is typically used in the following manner. Door 68 is opened as described above to permit access to the interior of housing 22. A piece of machinery such as a lawn mower is wheeled into the internal chamber of housing 22 and the body of the mower is placed under first and second housing spray racks 84 and 86 and over aperture 44 and base spray rack 88 (see FIG. 1). Both portions of door 68 are then closed and a hose, in fluid communication with a source of water or other cleaning fluids, is attached to inlet 92. As previously indicated, a pump or other device or means may be used to increase the pressure of water flowing into washing apparatus 80. Water or cleaning fluid flows through plumbing system 82 and exits the various spray racks through sprayers 90 (see FIG. 2) where it contacts the mower and removes grass, dirt, and debris from both the top and bottom surfaces thereof. The grass, dirt, and other debris pass through aperture 44, and are collected on tray 60. In some embodiments of this invention, the upper surface of base 42 is angled or graded to direct the flow of water across its surface and toward aperture 44. When the mower or other device is sufficiently clean, the source water or other fluid is terminated and door 68 is re-opened to allow the internal chamber and the contents thereof to dry. The mower and/or other machinery may be stored within storage apparatus 20 until the next use. Storage apparatus 20 may be locked in the closed position by inserting lockable cables, padlocks, or other securable devices through the ring-shaped portions of brackets 32 when door 68 is closed.

Figure 5:
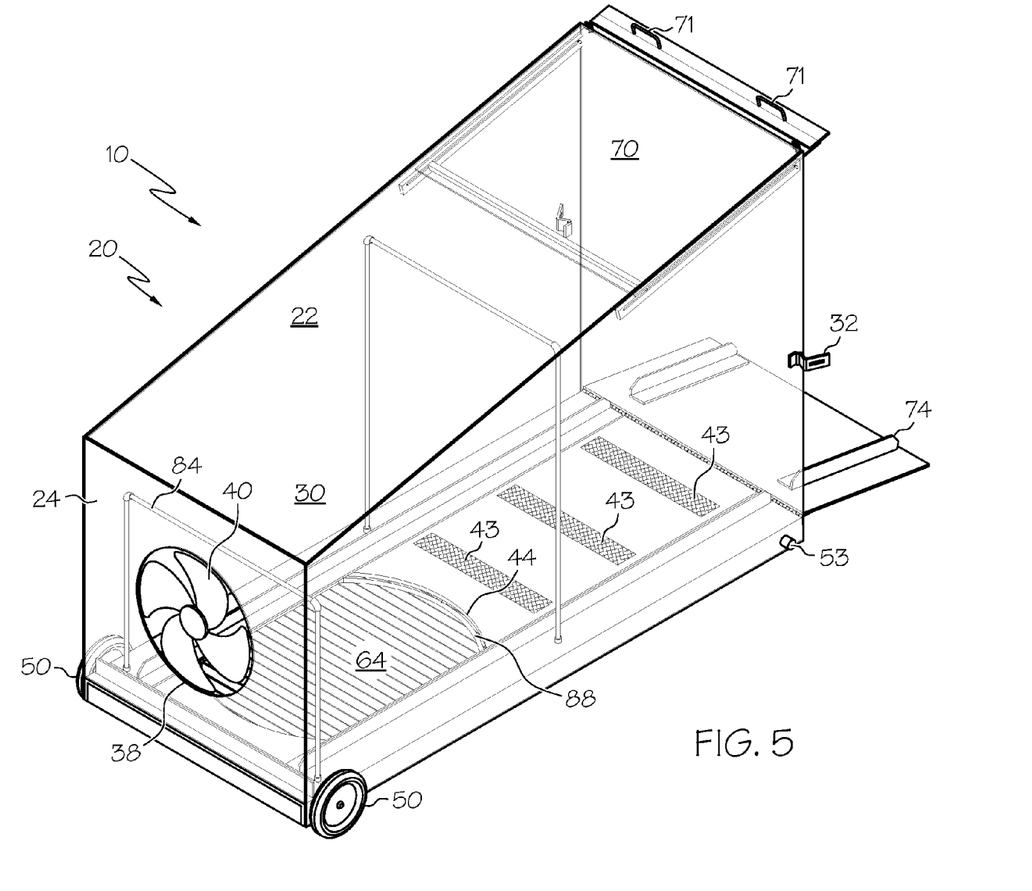
FIG. 5 is a front, perspective view of an alternate embodiment of the washing and storing system of FIG. 1, showing a vent formed in the front panel of the housing and a fan mounted within the vent.

FIG. 5 illustrates an embodiment of the present invention that includes additional features such as air vent 38 formed in front panel 24, and drainage grates or slots 43 formed in base 42 for facilitating the removal of water from storage apparatus 20. As shown in the Figure, an electric or gasoline powered fan 40 may be mounted within vent 38 to increase airflow through housing 22 for purposes of drying the interior thereof. In other embodiments, multiple air vents are included at various locations in housing 22 and fans may be mounted in some or all of the air vents for increasing airflow through storage apparatus 20. In the exemplary embodiments shown in the Figures, housing 22 is generally wedged-shaped to accommodate a common hand-operated lawn mower 100. In other embodiments, housing 22 may be rectangular, trapezoidal, domed, or may include various contoured panels. As will be appreciated by those skilled in the art, a variety of shapes and sizes are possible for housing 22. Similarly, plumbing system 82 may be assembled in a variety of configurations, some of which include additional spray racks and directional sprayers for accommodating larger pieces of machinery such as dirt bikes, all-terrain vehicles (ATVs), and riding mowers.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A washing and storing system, comprising:
   (a) a mobile storage apparatus, wherein the mobile storage apparatus further includes:
      (i) a housing, wherein the housing includes a front portion that is lower in height than the rear portion thereof and is adapted to receive and store a hand-operated lawn mower, wherein the housing defines an internal chamber therein, and wherein the housing further includes a top panel, and wherein the top panel further includes a door track on each side of the top panel;
      (ii) a base attached to or formed integrally with a bottom portion of the housing, wherein the base further includes at least one aperture formed therein, and wheel-guiding tracks for guiding a lawn mower into the housing;
      (iii) a removable debris tray attached to the base, wherein the tray is positionable beneath the aperture formed in the base; and
      (iv) a door assembly for gaining access to the internal chamber, wherein the door assembly further includes an upper portion connected to the housing and a lower portion connected to the base, wherein the upper portion of the door assembly is adapted to recede into the internal chamber by cooperating with the door tracks on the top panel of the housing and wherein lower portion of the door assembly functions as a ramp into the internal chamber and further includes wheel-guiding tracks for guiding a lawn mower into the housing; and (b) a washing apparatus connected to or formed integrally with the storage apparatus for washing the lawn mower, wherein the washing apparatus further includes:
  (i) a plurality of directional sprayers in fluid communication with one another;
  (ii) wherein a portion of the sprayers are mounted within the housing and are oriented downward for directing fluid onto the top of the lawn mower stored within the housing; and
  (iii) wherein a portion of the sprayers are mounted within the base around the periphery of the aperture and are oriented upward for directing fluid through the aperture onto the bottom of the lawn mower; and
(c) a source of pressurized fluid in fluid communication with the plurality of sprayers for providing fluid to the directional sprayers of the washing apparatus.

2. The system of claim 1, further comprising a pump connected to the source of pressurized fluid for increasing the pressure of fluid provided to the washing apparatus.

3. The system of claim 1, wherein the housing further includes at least one vent formed therein for facilitating airflow through the housing.

4. The system of claim 3, wherein the at least one vent further includes a blower mounted therein for directing airflow through the housing.

5. The system of claim 1, wherein the base further comprises a set of wheels attached to one end thereof for facilitating movement of the storage apparatus.

6. The system of claim 1, wherein the washing apparatus further comprises a quick-connect device for facilitating attachment of the source of pressurized fluid to the washing apparatus, and wherein the quick-connect device further includes a shut-off valve.

7. A washing and storing device, comprising:
(a) a mobile storage apparatus, wherein the mobile storage apparatus further includes:
  (i) a housing, wherein the housing includes a front portion that is lower in height than the rear portion thereof and is adapted to receive and store a hand-operated lawn mower, wherein the housing defines an internal chamber therein, and wherein the housing further includes a top panel, and wherein the top panel further includes a door track on each side of the top panel;
  (ii) a base attached to or formed integrally with a bottom portion of the housing, wherein the base further includes at least one aperture formed therein, and wheel-guiding tracks for guiding a lawn mower into the housing;
  (iii) a textured debris tray slidably attached to the base, wherein the tray is positionable beneath the aperture formed in the base; and
  (iv) a door assembly for gaining access to the internal chamber, wherein the door assembly further includes an upper portion connected to the housing and a lower portion connected to the base, wherein the upper portion of the door assembly is adapted to recede into the internal chamber by cooperating with the door tracks on the top panel of the housing and wherein lower portion of the door assembly functions as a ramp into the internal chamber and further includes wheel-guiding tracks for guiding the lawn mower into the housing; and
(b) a washing apparatus integrated into the storage apparatus for washing the hand-operated lawn mower enclosed within the storage apparatus, wherein the washing apparatus further includes:
  (i) a plurality of directional sprayers in fluid communication with one another;
  (ii) plumbing for connecting the plurality of directional sprayers to one another and to a source of pressurized fluid;
  (iii) wherein a portion of the sprayers are mounted within the housing and are oriented downward for directing fluid onto the top of the lawn mower stored within the housing; and
  (iv) wherein a portion of the sprayers are mounted within the base around the periphery of the aperture and are oriented upward for directing fluid through the aperture onto the bottom of the lawn mower.

8. The device of claim 7, wherein the housing further includes at least one vent formed therein for facilitating airflow through the housing.

9. The device of claim 8, wherein the at least one vent further includes a blower mounted therein for further directing airflow through the housing.

10. The device of claim 7, wherein the base further comprises a set of wheels attached to one end thereof for facilitating movement of the storage apparatus.

11. The device of claim 7, wherein the base further comprises a drainage basin attached to or formed integrally with the underside thereof, and wherein the drainage basin is located beneath the at least one drainage aperture.

* * * * *

UNITED STATES PATENT AND TRADEMARK OFFICE
CERTIFICATE OF CORRECTION

PATENT NO. : 7,775,225 B2  Page 1 of 1
APPLICATION NO. : 11/675170
DATED : August 17, 2010
INVENTOR(S) : Gary Wade It is certified that error appears in the above-identified patent and that said Letters Patent is hereby corrected as shown below:

Title Page; item (54);
In the Title, "WASHING AND STORING SYSTEMS FOR MACHINERY" should read --WASHING AND STORING SYSTEM FOR MACHINERY--

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,775,225 B2  Page 1 of 1
APPLICATION NO. : 11/675170
DATED : August 17, 2010
INVENTOR(S) : Gary Wade

It is certified that error appears in the above-identified patent and that said Letters Patent is hereby corrected as shown below:

Title Page; item (54) and at Column 1, lines 1 and 2;
In the Title, "WASHING AND STORING SYSTEMS FOR MACHINERY" should read --WASHING AND STORING SYSTEM FOR MACHINERY--

This certificate supersedes the Certificate of Correction issued September 28, 2010.

Signed and Sealed this

Ninth Day of November, 2010

David J. Kappos
*Director of the United States Patent and Trademark Office*